Figure 1:
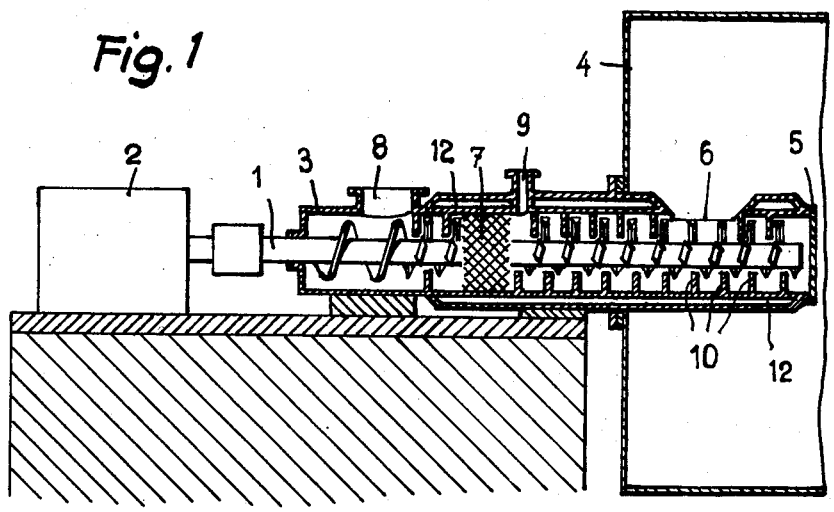

April 12, 1960

H. LIST ET AL 2,932,557

METHOD AND APPARATUS FOR THE CONTINUOUS
PRODUCTION OF HYDROFLUORIC ACID
Filed July 16, 1956

INVENTORS
HEINZ LIST
ROBERT WOLLAK

BY *Wenderoth, Lind & Ponack*
Attys.

2,932,557
METHOD AND APPARATUS FOR THE CONTINUOUS PRODUCTION OF HYDROFLUORIC ACID

Heinz List, Pratteln, near Basel, and Robert Wollak, Muttenz, near Basel, Switzerland, assignors to Buss A. G., Basel, Switzerland, a Swiss company Application July 16, 1956, Serial No. 598,127

Claims priority, application Switzerland June 29, 1953

17 Claims. (Cl. 23—153)

At present hydrofluoric acid is produced by reacting fluorspar and sulfuric acid in externally heated reaction furnaces made of soft steel. In the more recent processes the reaction mixture is continuously passed through the furnace. The furnace is charged by separately feeding fluorspar and sulfuric acid by means of continuously operating devices. The drawback of all the reaction furnaces hitherto used consists in the fact that due to lump formation of the reaction mixture it is extremely difficult to obtain homogeneous mixing of the fluorspar and the sulfuric acid in the furnace and that for this reason an excess of sulfuric acid over the amount theoretically required must be used. This excess of sulfuric acid is very disadvantageous insofar as in the course of the reaction by-products are formed which have a highly corrosive effect, particularly on the inlet portion of the furnace. Moreover, the sulfuric acid vapor carried along by the HF vapor contaminates the end product and inhibits the condensation of the HF vapor so that it is frequently necessary to subject the hydrofluoric acid so obtained to a separate distillation and rectification.

We have found that the above mentioned drawbacks can be substantially avoided if the reaction furnaces are charged with a homogeneous mixture of fluorspar and sulfuric acid. However, as the reaction between fluorspar and sulfuric acid may take place even at ordinary temperatures, care must be taken that the formed hydrofluoric acid does not escape into the atmosphere.

The continuous preparation of hydrofluoric acid by interaction of fluorspar and sulfuric acid in a reaction furnace according to the present invention comprises the steps of mixing the two reactants prior to their introduction into the reacion furnace by introducing them at separate inlet points into a continuously operating mixing and conveying device opening into the reaction furnace, and of damming the fluorspar in that portion of the mixing and conveying device which is located between the separate inlet points in order to form a plug which prevents gas from escaping in the direction opposite to the conveying direction, the interaction of fluorspar and sulfuric acid being completed in the said mixing device by supply of heat in order to produce a granular product.

It may also be advantageous to add to the reaction mixture an additive material which does not take part in the reaction and may exert a catalytic action on the reaction.

Tests have shown that a granular product is produced in the said mixing device, if the reaction of fluorspar and sulfuric acid takes place in the mixing device disclosed herein in the presence of heat. The heat supply can be controlled in any suitable way by the walls of the shaft of the kneading machine and/or by a preheating of the sulfuric acid. It has been observed that, even after a partial reaction between fluorspar and sulfuric acid has taken place in the mixing device, the reaction product will have a granular appearance, whereupon this reaction product is transferred to the reaction furnace, in which—due to further completion of the reaction course—the reaction mixture is converted into a dry powder which does not stick to the walls.

The method and apparatus of the present invention enable a trouble-free passing of the reaction product, which is partly formed in the mixing device, and of unreacted fluorspar and sulfuric acid. Compared with the methods used hitherto the new method of this invention requires a much smaller excess of acid and allows a very satisfactory reaction course. This is due to the fact that segregation of both the reaction components is no longer possible after the same had left the mixing machine. Thus a local lack or shortage of acid will be avoided.

For carrying out this process a mixer of the worm type for example can be used.

Figure 2:
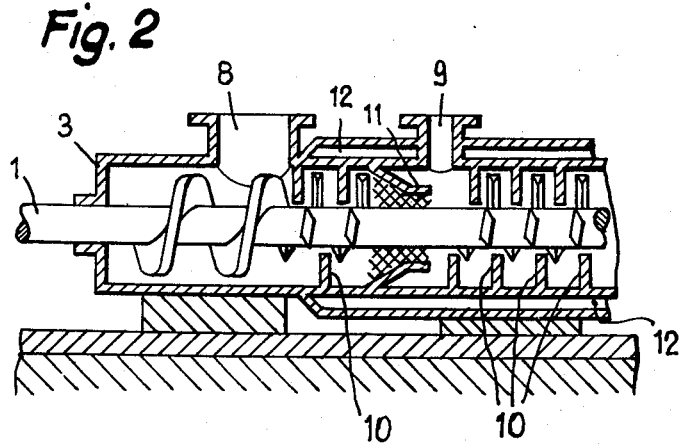

A mixing and kneading machine suitable for carrying out the process according to the present invention is shown in the accompanying drawing in which Fig. 1 is a vertical section of the mixing and kneading machine, and Fig. 2 shows a detail of the mixing and kneading machine.

The mixing machine, which simultaneously acts as a kneading machine, comprises a worm 1 driven by a driving mechanism 2 and a casing 3 which is secured to the shell of the reaction furnace 4. The casing 3 is provided with separate inlets 8 and 9 respectively for the introduction of fluorspar and sulfuric acid, respectively. Furthermore heating means of any suitable type are provided, which furnish the required optimum reaction temperature in the mixing machine. In the present form the reaction furnace has a vertical shell. Obviously the mixing and kneading machine could be connected to a rotatable or otherwise movable casing of the reaction furnace. Tightness between the reaction furnace and the mixing and kneading machine can be obtained in a known manner by a packing bush or a sliding ring (e.g. a rotary furnace packing). The mixing and kneading machine is provided with mixing and kneading teeth 10 attached to the casing 3. The worm performs a reciprocating movement and the mixing and kneading teeth pass through gaps in the helicoidal worm blade, thus causing a particularly intensive mixing effect.

Obviously other mixing and kneading worms could be used, provided that they allow a good mixing effect to be obtained, as is the case with the above described worm device.

The closure preventing the hydrofluoric acid from escaping from the inside of the mixing and kneading machine as well as of the reaction furnace into the atmosphere is formed by the plug 7. This plug is formed by damming the fluorspar in the mixing and kneading machine between the inlet 8 for fluorspar and the inlet 9 for sulfuric acid. This damming effect is brought about by cooperation of a toothless portion of the casing 3, the length of this portion being equal to the length of the plug to be formed, with a gap in the worm the width of which corresponds to the length of the plug to be formed. The fluorspar supplied by the worm fills the toothless portion of the casing 3. The plug 7 is pushed in the direction of the exit of the mixing and kneading machine by the continuous fluorspar supply and brought again into contact with the worm at the end of the toothless portion. Thus, the plug is continuously renewed by the supply of fresh material from the admission end of the mixing and kneading machine, the plug being continuously broken by the worm at the end of the toothless portion. As the plug is maintained wet by the introduced sulfuric acid, an excellent gas-tight closure is secured.

The density of the closing plug can be increased by reducing the cross-section of the plug, for example by means of a nozzle 11 (Fig. 2) of any section through which the fluorspar is pressed so that the pressure on the plug and the homogeneity are still increased. The reduction of the section of the plug can also be brought about by means of a perforated disc.

In order to get a granular solid comprising sufficient grooves, slots or the like for the escapement of the resultant hydrofluoric acid it may be advisable to add to the reaction mixture an additive agent which preferably may be present in a powder form and which does not take part in the reaction and/or has a catalytic action on the reaction. The additive agent can be the calcium sulfate which is formed when causing fluorspar to react with sulfuric acid.

In order to facilitate distribution of the reaction mixture in the reaction furnace it may be advantageous to provide at the outlet end of the mixing and kneading machine an element which will give a granular form to the emerging reaction mixture. This element may be, for example, a perforated plate 5 (Fig. 1). As a further gastight closure is obtained by such an arrangement, it is expedient to provide an exit aperture 6 in that portion of the casing of the mixing and kneading machine which projects into the reaction furnace in order that the hydrofluoric acid, which already forms at ordinary temperature during the thorough mixing of the fluorspar and the sulfuric acid, may escape.

Instead of the inlet 9, through which the sulfuric acid is introduced into the mixing device, it is also possible to provide two or more inlets permitting the introduction of the sulfuric acid into the fluorspar at several staggered points of the said kneading device.

Further advantages of the present invention reside in the fact that the furnace is less subjected to chemical attack, because a rapid and smooth reaction course is secured even at relatively low temperatures due to the homogeneity of the reaction mass and the voluminous surface of the same.

Since according to the present invention the production of hydrofluoric acid can be carried out at lower reaction temperatures than when working according to the known methods, it is also possible to lower the partial pressure of the sulfuric acid, whereby a purer reaction product is obtained when causing sulfuric acid to react with fluorspar.

The present application is a continuation-in-part application of U.S. patent application Serial No. 439,710, filed June 28, 1954, now abandoned.

What we claim is:

1. In a continuous process for preparing hydrogen fluoride by reacting fluorspar with sulfuric acid in a reaction furnace, the steps of introducing the fluorspar and sulfuric acid at separate inlet points into a continuously operating mixing and conveying zone, damming the fluorspar in that portion of the mixing and conveying zone which is located between the separate inlet points to form a plug which prevents gas from escaping in the direction opposite the conveying direction, and kneading the fluorspar with the sulfuric acid in said mixing and conveying zone under the influence of heat before said reactants are introduced into the reaction furnace.

2. A continuous process according to claim 1, which comprises using a mixer of the worm-operated type as mixing and conveying device.

3. A continuous process according to claim 1, in which said damming of the fluorspar is brought about by means of a worm having a gap, the width of which being equal to the length of the plug to be formed.

4. A continuous process according to claim 1, in which the density of the plug is increased by increasing the pressure by means of reduction of the section of said mixer in a portion thereof located between said inlets.

5. A continuous process according to claim 4, in which said reduction of section is brought about by means of a nozzle through which the fluorspar is pressed.

6. A continuous process according to claim 4, in which said reduction of section is brought about by means of a perforated plate.

7. A continuous process according to claim 1, in which the mixture of fluorspar and sulfuric acid is granulated at the outlet end of said mixer.

8. A continuous process according to claim 1, in which an additive material promoting the formation of a porous reaction product and facilitating the escape from the reaction mass of the hydrogen fluoride formed in the reaction is added to the mixture of fluorspar and sulfuric acid.

9. A continuous process according to claim 8, in which an additive material is used which does not take part in the reaction.

10. A process according to claim 8, in which an additive material is used which exerts a catalytic action on the reaction.

11. A process according to claim 8, in which the additive material is the calcium sulfate itself which is formed when reacting fluorspar with sulfuric acid.

12. A process according to claim 1, in which the sulfuric acid is added gradually to the fluorspar passing through the mixing device at more than one point of the device.

13. A mixing and kneading machine for introducing reactants into a furnace, said machine having a cylindrical casing containing an axial worm conveyor, driving means operatively connected to the conveyor for rotating and reciprocating said conveyor, kneading teeth internally attached to said casing so that they cooperate with the worm conveyor when the latter is in motion, means for heating the cylindrical casing, inlet means external of the furnace and axially spaced along said casing, damming means located between two successive inlets to restrict the passage of material introduced further downstream, and outlet means axially spaced from the inlet means and surrounded by said furnace.

14. In a continuous process according to claim 1 the addition to reactants of a material which does not take part in the reaction.

15. A process according to claim 14 in which the additional material is calcium sulfate.

16. In a continuous process according to claim 1 fluoride in which reactants are introduced into a reaction furnace, premixing the reactants prior to said introduction.

17. In a continuous process according to claim 1, the reuse of calcium sulfate formed during the process by adding said calcium sulfate to the reactants.

References Cited in the file of this patent

UNITED STATES PATENTS

| | | |
|---|---|---|
| 1,150,415 | Bishop | Aug. 17, 1915 |
| 1,512,734 | Wescott | Oct. 21, 1924 |
| 1,528,348 | Taylor | Mar. 3, 1925 |
| 1,748,735 | Scott | Feb. 25, 1930 |
| 2,066,756 | Anderson | Jan. 5, 1937 |
| 2,626,856 | Alles | Jan. 27, 1953 |